UNITED STATES PATENT OFFICE.

STEPHEN G. ARMSTRONG, OF BERRIEN SPRINGS, MICHIGAN.

COMBINED MEDICAL COMPOUND AND CONFECTION.

SPECIFICATION forming part of Letters Patent No. 366,992, dated July 19, 1887.

Application filed October 2, 1886. Serial No. 215,164. (No specimens.)

*To all whom it may concern:*

Be it known that I, STEPHEN G. ARMSTRONG, a citizen of the United States, residing at Berrien Springs, in the county of Berrien and State of Michigan, have invented certain new and useful Improvements in a Combined Confection and Medicinal Compound or Mixture, also Product and Process; and I do hereby declare the following to be a full, clear, and exact description of the invention, such as will enable others skilled in the art to which it appertains to make and use the same.

My invention consists in a combined confection and medicinal compound or mixture comprising as its ingredients browned wheat-bran and gum-paste or tragacanth paste, known as "gum-drop" material of commerce.

It also consists in a combined confection and medicinal compound or mixture comprising as its ingredients browned wheat-bran and a gum-paste—for instance, gum-drop material of commerce or tragacanth paste—and made either into the form of cakes, blocks, cylinders, cones, or balls, and of sizes suitable for doses for either adults or children.

My combined confection and medicinal compound or mixture is composed of wheat-bran browned or baked to about the extent to which coffee is generally roasted, and of gum drop material known as "gum-paste" or "tragacanth paste."

The mixture or compound is in its production or manufacture brought to a sufficiently firm and consistent condition to retain its form under the influence of ordinary temperature of the atmosphere, and it is capable of being cut up into sections of any desired shapes and into sizes suitable for doses for adults and children.

The process of making the bran and gum or combined confection and medicinal compound or mixture, so as to furnish it as an agreeable article to the taste, may be as follows: Take ten (10) pounds of gum-paste or tragacanth paste, known as "gum-drop" material of commerce, (now manufactured by steam machinery on a large scale and sold at a low price,) and place the same in a suitable vessel on a stove and containing about two gills of hot water, mash the gum-paste or tragacanth paste in the vessel with a pestle, and stir it until it is well dissolved and converted into a stiff jelly; flavor it with a few drops of oil—either of lemon, orange, rose, or any other essential-oil, as may be preferred—and then add two (2) pounds of bran, which has been previously browned or baked in an oven to about the degree that coffee is usually roasted, and after thoroughly mixing the whole mass empty it upon a marble slab or a board, knead it thoroughly, and roll or spread it with a roller until it is about one-third or one-half inch thick, and then cut it into pieces of any desired shape and of suitable sizes with any proper cutting implement. The size for a dose for an adult would be about one and one-half inch square and one-third of an inch thick, and for a child about one-third the size of that for an adult. These doses may, however, be varied.

The gum-drop material—as gum-paste or tragacanth paste—is usually made of gum-arabic mixed with sugar, or gelatine mixed with sugar with or without gum-arabic, or of gum tragacanth mixed with sugar with or without gelatine.

The wheat-bran freed from foreign matter is baked or browned in an oven or otherwise. By browning the bran its taste is improved. The bran and gum-paste or tragacanth paste may be mixed in any other suitable proportions—for instance, equal part in bulk of bran and equal part in bulk of gum, or an unequal part of gum and an unequal part of bran may be adopted; but in all cases it is preferable to use a larger proportion of bran than gum, as the leading object of my invention in using the gum is to pleasantly introduce into the stomach the bran in large quantity as a medicinal agent. The flavoring substances mentioned may be dispensed with, if thought best.

By my invention an agreeable and palatable way of introducing wheat-bran medicinally into the stomach and alimentary canal of a person is provided, the patient eating or chewing and swallowing the combined confection and medicinal mixture or compound with the same relish and pleasure as one does any other gum-confection, and suffering no injury from the gum and flavoring-oil.

My invention enables the physician to conveniently and successfully administer bran to his patients, and thus avail himself of the acknowledged efficacy of this remedy for acting upon the lining of the stomach and the intestines.

From an experience of about twenty-five years in the practice of medicine I have determined that the roughness, mechanical action, or friction of wheat-bran on the coatings of the stomach and intestines is a powerful and harmless method of awakening the nerve and vital or healing force of the human system; that it produces strong digestion, great regularity of the bowels, and largely tends to increase the physiological action of the organs and the entire body, sufficiently so to commend its use in most cases for consumption. Heretofore the difficulty has been to get the bran into a patient's stomach; but my invention entirely obviates that difficulty, and, if desired, the compound may be used as a vehicle for conducting other desirable medicines in powder or solution—as, for instance, soluble citrate of iron and pepsin or lacto-peptine may be added in proper proportions to the compound or mixture whenever desirable and carried along with it into the stomach.

The pieces or doses of the compound of browned bran and gum-paste or tragacanth paste are firm and may be said to possess consistency, sweetness, and flavor, and they are quite toothsome and enjoyable, while they are very nutritious and a potent invigorator of the human organization. The most beneficial effects from the compound will be experienced if the doses are taken before each meal, and of course the quantity and necessity and length of time for continuing the remedy will be determined by the medical advisers of patients, or instructions sent out in the packages containing the compound.

What I claim as my invention, and desire to secure by Letters Patent, is—

1. The within-described combined confection and medicinal compound or mixture, comprising as its ingredients browned bran and gum-paste or tragacanth paste, for the purpose set forth.

2. The within described combined confection and medicinal compound or mixture, comprising as its ingredients browned bran and gum-paste or tragacanth paste, and made in pieces of sizes suitable for doses, as set forth.

In testimony whereof I affix my signature in presence of two witnesses.

STEPHEN G. ARMSTRONG.

Witnesses:
   ALEXANDER B. LEEDS,
   LEAH LEEDS.